INVENTOR.
RICHARD R. SECUNDE
BY Bosworth, Sessions
Herrstrom & Knowles
ATTORNEYS

# United States Patent Office 3,407,338
Patented Oct. 22, 1968

3,407,338
VOLTAGE SENSING AND PROTECTION CIRCUIT
Richard R. Secunde, Seven Hills, Ohio, assignor to Lear Siegler, Inc., Santa Monica, Calif., a corporation of Delaware
Filed Mar. 17, 1966, Ser. No. 535,168
6 Claims. (Cl. 317—22)

ABSTRACT OF THE DISCLOSURE

A voltage sensing and protection apparatus for electric power transmission systems that is responsive to both overvoltage and undervoltage conditions. In an alternating current system, filter and rectifier sections are connected to each phase of the system. The filter and rectifier sections are each connected to an overvoltage sensing and time delay circuit through an OR logic circuit and are each connected to an undervoltage sensing and time delay circuit through an AND logic circuit. Both of the sensing and time delay circuits are connected to a single control circuit for the system.

---

Figure 1:
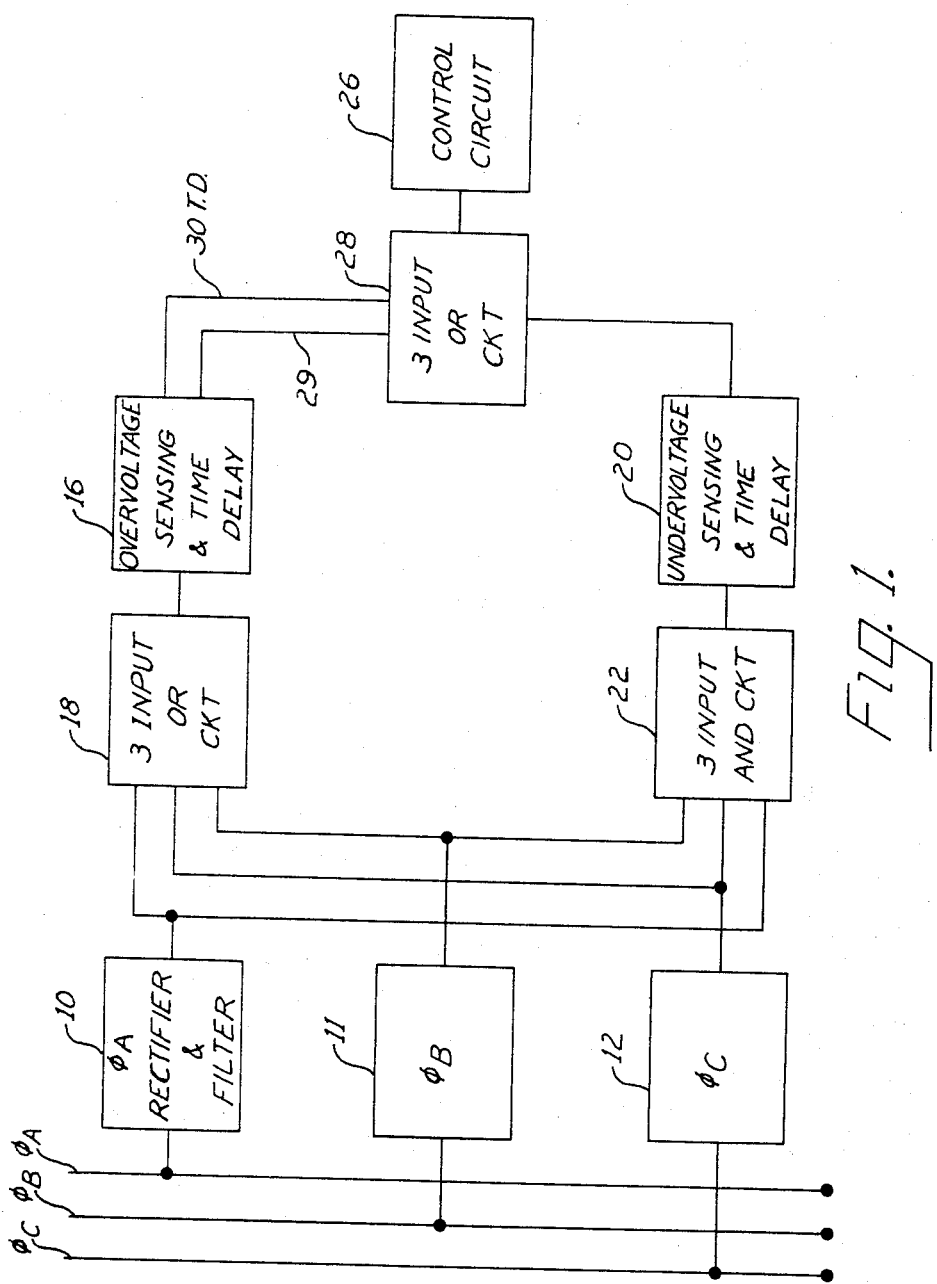

This invention relates to electrical system protection and more particularly to a protective apparatus responsive to overvoltage and undervoltage conditions on a power generation system.

Overvoltage responsive protective systems are well-known in the art. One example of these types of circuits are described in an article entitled, "A Transistorized Overvoltage Relay," by N. F. Schuh in Paper 55–828, published by A.I.E.E. in January 1956. Other examples are disclosed in U.S. Patent No. 2,940,033 to McConnell et al. and U.S. Patent No. 3,159,767 to Secunde et al. Examples of undervoltage sensing circuits are disclosed in Schuh et al. U.S. Patent No. 3,001,100, Samois et al. U.S. Patent No. 2,386,770, and Harder U.S. Patent No. 2,393,043. The concept of overvoltage and undervoltage protection relative to a limited desired range of output voltage and the problems relevant thereto are usually resolved by separate and independent circuits. This, however, results in certain duplication of similar functions and therefore is somewhat uneconomical and impractical.

Accordingly, it is an object of this invention to provide an improved protective apparatus for responding to abnormal electrical conditions on an electrical generation system beyond a predetermined range of desired conditions.

It is another object of this invention to provide an abnormal condition electrical protection apparatus for a power generation system having a control circuit actuated by the abnormal condition including an overvoltage sensing means having a manually adjustable minimum trip level or sensitivity control and an undervoltage sensing means also having a manually adjustable sensitivity control, both coupled to the generation system and to the control circuit whereby the control circuit is actuated by either abnormal voltage condition, relative to a desired or selected range of voltages.

Another object of this invention is to provide an overvoltage and undervoltage sensing electrical control apparatus for a power generation system in which the sensing circuits are coupled to a single control circuit by time delay circuits in which one of the time delay circuits has a delay which is inversely proportional to the magnitude of the abnormal voltage and another of the time delay circuits has a delay which is independent of the system voltages.

A still further object of this invention is to provide an electrical generation system with an overvoltage sensing apparatus, a control circuit and time delay circuits between the overvoltage sensing and undervoltage sensing apparatus and the control circuit, one of which time delay circuits has a delay which is inversely proportional to the magnitude of the overvoltage, and in which each time delay circuit is provided with a resetting circuit which resets that time delay circuit if the abnormal condition disappears before the delay interval of that time delay circuit.

Yet another object of this invention is to provide an abnormal voltage sensing apparatus for an electrical generation system which apparatus includes a control circuit and sensing circuits for sensing overvoltage and undervoltage conditions both relative to a predetermined desired range of voltages, and a circuit coupling the overvoltage sensing circuit with a control circuit to respond to a ceiling reference voltage and instantaneously trip the control circuit when the generator output exceeds the ceiling reference voltage.

It is another object of this invention to provide an improved abnormal voltage protection apparatus with a common control circuit and variable time delay circuits having independent delay intervals for each abnormal condition wherein at least one time delay circuit is reset if the abnormal condition disappears before the end of the time delay interval and wherein the apparatus is capable of responding without time delay to an overvoltage above a predetermined, manually selectable ceiling reference voltage, which control circuit is alternatively actuated by either an overvoltage sensing or an undervoltage sensing network both undervoltage and overvoltage being relative to a preselected range of desired voltages.

A still further object of this invention is to provide an electrical system with an abnormal voltage responsive apparatus which is simple in construction, economical to construct, has a minimum of parts and requires a minimum of maintenance.

Briefly in accordance with aspects of this invention, a polyphase generating system is provided with a control apparatus including rectifier and filter systems for each individual phase. The apparatus includes an overvoltage sensing and undervoltage sensing apparatus coupled to the filter circuits through different types of logic means such that the filter circuits provide signals for both overvoltage sensing and undervoltage sensing. The apparatus also includes a common control circuit to be actuated by either abnormal voltage condition. This control circuit is advantageously coupled to both the overvoltage and the undervoltage sensing systems through independent time delay circuits. The control circuit is connected to the overvoltage sensing system through a time delay network in which the delay interval is proportional to the magnitude of the overvoltage. In accordance with aspects of this invention, the overvoltage sensing circuit is also connected to the control circuit through a ceiling reference voltage circuit, such that the control circuit will be instantaneously tripped in response to a phase voltage greater than the predetermined ceiling reference voltage. In accordance with other aspects of this invention, the control circuit is connected to the undervoltage sensing circuit through a time delay circuit in which the time delay is constant and is manually variable. Advantageously, this time delay circuit is provided with a resetting network to reset the time delay circuit if the undervoltage condition disappears before the end of the time delay interval. In accordance with still further aspects of this invention, the control circuit is coupled to the overvoltage sensing and undervoltage sensing circuits through logic means such that any of the voltage responsive circuits may actuate the control circuit.

Figure 2:
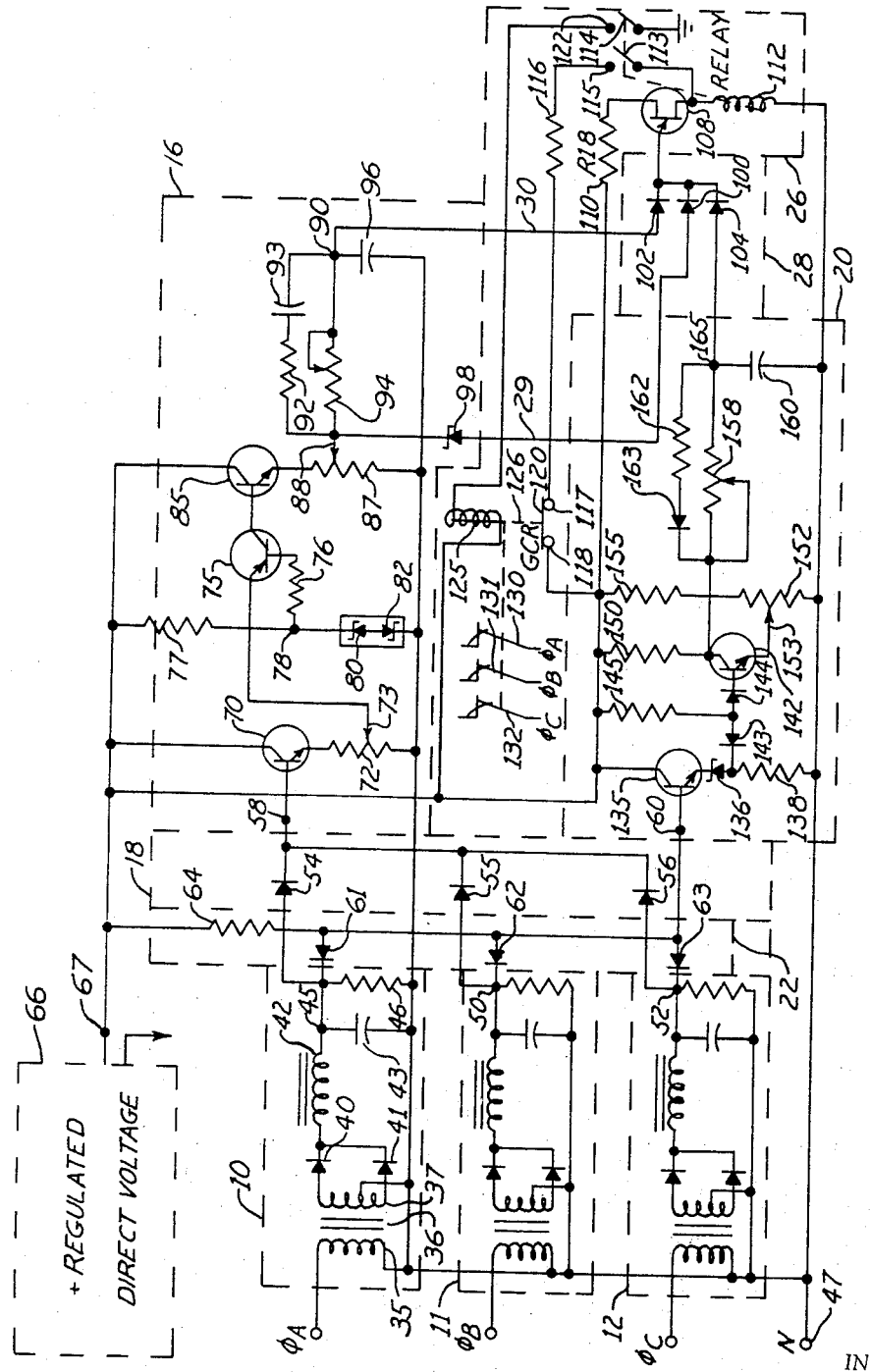

These and various other objects, features and advantages of the invention will become more apparent from a reading of the detailed description in conjunction with the drawing which constitutes the best known mode of practicing the invention in which:

FIGURE 1 is a block diagram of one illustrative embodiment of this invention; and FIG. 2 is a schematic representation of the embodiment of FIGURE 1.

One embodiment of the invention is shown in block diagram form in FIGURE 1 and this embodiment is explained in conjunction with a three-phase generating system including generator output phases A, B and C. This apparatus, because of its small size, low power consumption and reliability is particularly suitable for aircraft power systems. It will be apparent, however, that this system is capable of being employed with any alternating current system of any number of phases including single phase and is also capable of being employed with a direct current generating system as will be subsequently described in detail. This embodiment includes individual phase filter and rectifier sections 10, 11 and 12 connected to phases A, B and C, respectively. The apparatus is capable of responding to independently and manually selectable overvoltages and undervoltages, both relative to predetermined desired or selected ranges of voltage values and includes an overvoltage sensing circuit and time delay circuit 16, coupled to each of the respective phase filters 10, 11 and 12 through a logic circuit which in this particular instance is a three-input OR circuit 18. The apparatus includes an undervoltage sensing and time delay circuit 20 coupled to each of the respective phase filters 10, 11 and 12 through a logic circuit which in this particular instance is a three-input AND circuit 22. The apparatus includes a single control circuit 26 which is to be actuated in response to a plurality of predetermined abnormal voltage conditions by the overvoltage and undevoltage sensing and time delay circuits 16, 20, respectively. This is accomplished by coupling the control circuit 26 through a three-input OR logic circuit 28 to the overvoltage sensing and time delay circuits 16 and to the undervoltage sensing and time delay circuit 20. It is to be noted that the overvoltage sensing and time delay circuit is connected to the three-input OR circuit 28 through a pair of conductors 29, 30 to actuate the control circuit 26 in response to either of two overvoltage conditons which will be subsequently described in detail. The conductor 30 is employed in conjunction with a predetermined, manually settable time delay between the actuation of the overvoltage sensing portion of the circuit 16 and the actuation of the control circuit 26 through the three-input OR circuits 28. The conductor 29, however, is employed to deliver a signal from the overvoltage sensing and time delay circuit 16 to actuate the controls circuit 26 through the three-input OR circuits 28 instantaneously if the overvoltage on any one of pases A, B or C exceeds a predetermined ceiling reference voltage.

One schematic illustration of the embodiment shown in block form in FIGURE 1 is shown in FIGURE 2. The circuits for sensing of overvoltages and undervoltages utilize common input transformers and common rectifier-filter circuits for highest and lowest phase voltage sensing. The blocks indicated in dotted outline in FIGURE 2 contain the schemtaic portion of the circuit performing the function indicated by the corresponding solid line block in FIGURE 1. Because these common rectifier-filter circuits are identical, only phase A circuit 10 will be described in detail. The rectifier-filter circuit 10 includes a suitable transformer 34 having a primary winding 35, a core 36 and a center-tapped secondary or output winding 37. In this particular instance, the secondary of the transformers are designed to provide a voltage step-down of approximately 6–1 relative to the center-tap. The output voltage of the secondary 37 is fed through a full wave rectifier arrangement including rectifiers 40, 41. The rectified output is fed through and filtered by a suitable choke coil 42, and a suitable capacitor 43. Filter capacitor 43 is connected to the output terminal 45 as is the output side of the choke 42. A suitable bleeder resistor 46 is connected between the output terminal 45 and the common neutral 47 to insure a continuous current flow through the inductor or choke 42. It is to be noted that a LC filter is preferred relative to a RC filter, because the direct current voltage should be virtually free from ripple to provide accurate control to the apparatus. The output terminal 50 for the B phase rectifier filter network 11 and an output terminal 52 for the C phase rectifier filter network 12 are each connected through suitable logic circuits to undervoltage and overvoltage sensing circuits, respectively.

The outputs of the rectifier-filter circuits 10, 11 and 12 are connected to the overvoltage sensing and time delay circuits 16 through a three-input OR circuit 18 which, in this particular instance, comprises rectifiers 54, 55 and 56. Thus each of these rectifiers is connected between one of the terminals 45, 50 and 52 of the rectifier and filter circuits 10, 11 and 12 and an input terminal 58 of the overvoltage sensing and time delay circuit 16. The undervoltage sensing and time delay circuit 20 has an input terminal 60 coupled to the rectifier and filter output terminals 45, 50 and 52 through a three-input AND circuit 22 including rectifiers 61, 62 and 63 and a resistor 64 which has one end connected to the input terminal 60 and the other end connected to a positive terminal 67 of a source of regulated direct current voltage 66. The other terminal of the source 66 is connected to the neutral terminal 47 of the power transmission system.

The overvoltage sensing and time delay circuit 16 includes a transistor 70 having its collector connected to the direct current terminal 67 and its base connected to the overvoltage sensing input terminal 58. The emitter of transmitter 70 is connected to the common neutral terminal 47 through a potentiometer resistor 72 having a variable tap 73. The variable tap 73 provides a means for manually setting the minimum trip level or the minimum level at which the overvoltage sensing circuit is actuated. Tap 73 is connected to the emitter of a transistor 75. The base of transistor 75 is connected through a series circuit including a resistor 76 and a resistor 77 to the positive terminal 67 of the regulated direct voltage supply 66. Terminal 78 intermediate resistors 76 and 77 is held at a reference voltage by a reference voltage network including a Zener diode 80, a rectifier 82 and resistor 77 serially-connected between the neutral terminal 47 and the terminal 67. Thus, a reference voltage normally exists at terminal 78 because of the connection of this reference voltage circuit across the regulated direct current voltage source 66 in a manner well-known in the art.

The collector of transistor 75 is connected to the base of a transistor 85, the collector of which is connected to the positive terminal 67 of the regulated direct current voltage source 66. The emitter of transistor 85 is connected to the common neutral terminal 47 through a potentiometer resistor 87 by the variable tap 88 of which is connected to a time delay network.

The time delay or timing portion of the circuit 16 is connected to variable tap 88 and has an output terminal 90. The timing circuit includes a resistor 92 and a capacitor 93 connected between the sliding tap 88 and the terminal 90, a variable resistor 94 connected between tap 88 and terminal 90 and connected in parallel with the RC circuit 92, 93 and capacitor 96 connected between the terminal 90 and the common neutral terminal 47. The serially-connected resistor 92 and capacitor 93 comprise an overvoltage shaping circuit to control the shape of the time delay curve of the overvoltage circuit to thus control to a limited degree the charging rate of the capacitor 96. Variable resistor 94 provides a means for manually adjusting the time delay of the circuit 16 because the magnitude of the resistance presented by resistor 94 determines the charging rate of the capacitor 96 when the transistor 85 is rendered conducting. The overvoltage sensing circuit includes a Zener diode 98 serially-connected between the sliding tap 88 and a diode 100 of the OR circuit 28. OR circuit 28 also includes a diode 102 connected to the timing or time delay output terminal 90 and a diode 104 connected to the output of the undervoltage sensing and time delay circuit 20, which sensing circuit will be subsequently described. The control circuit 26 includes a unijunction transistor 108 having its emitter electrode connected to the cathodes of rectifiers 100, 102 and 104 such that a voltage signal of sufficient magnitude appearing upon the cathodes of any one of these three rectifiers will cause conduction of the unijunction transistor 108. One of the bases of unijunction transistor 108 is connected to positive terminal 67 of source 66 by means of a resistor 110. The other base of unijunction transistor 108 is connected to neutral terminal 47 through a relay winding 112 which is magnetically coupled to a pair of armatures 113, 114 in a manner well-known in the art. Armature 113 is mounted to engage a contact 115 which is connected through a resistor 116, a pair of contacts 117, 118 and an associated armature 120 to the positive terminal 67 of source 66. Thus when the relay winding 112 is energized and attracts armature 113 into engagement with contact 115, a locking or hold-up circuit is provided to maintain current flow through the relay winding 112 from the source 66 through the contacts 117, 118, 120 and the resistor 116. Also, when the winding 112 is energized it attracts armature 114 into engagement with the associated contact 122 which is connected to a trip winding 125. The trip winding 125 is connected to the terminal 67 of source 66 and thus will be energized when the contact or armature 114 closes with the contact 122. Actuation of this trip circuit attracts the associated armature 120, opening the circuit between the contact 117, 118 and thus de-energizing the relay winding 112, restoring the apparatus to normal. Armature 126 is also mechanically connected to a group of three armatures 130, 131 and 132 located in the A, B and C phases, respectively, of a generator, not shown. Accordingly, actuation of the winding 125 will affectively control the three phase power generating system by opening the contacts 130, 131 and 132. These armatures are preferably of the latching type which must be released before power generation is restored.

The undervoltage sensing and time delay circuits 20 have an input terminal 60 coupled to the three input AND circuit 22 in a manner previously described to receive and respond to undervoltage signals from the least voltage of the three phases. This circuit includes a transistor 135 having its base connected to the input terminal 60, is collector connected to the positive terminal 67 of source 66 and its emitter connected to the common neutral terminal 47 through a series circuit including a Zener diode 136 and a resistor 138. The point intermediate Zener diode 136 and resistor 138 is connected to the base of a transistor 142 through a pair of serially-connected diodes 143, 144 connected in polarity opposition and having their common terminal connected by a resistor 145 to the positive terminal 67 of source 66. The collector of transistor 142 is connected to positive terminal 67 through a resistor 150 and the emitter is connected to the common neutral terminal 47 through a potentiometer resistor 152. Adustment of the independently manually variable tap 153 on the resistor 152 constitutes an adjustment of the comparison voltage against which a comparison is made of the low voltage appearing at terminal 60. The resistor 152 is also connected through a fixed resistor 155 to the positive terminal 67 of source 66. The collector of transistor 142 is connected to a timing network or time delay network including a variable resistor 158 and a capacitor 160. Resistor 158 provides a means for manually adjusting the undervoltage time delay. A series combination of a resistor 162 and a diode 163 are connected in parallel with the variable resistor 158 to provide a discharge circuit for capacitor 160. This is a low resistance discharge path to allow rapid timing circuit reset in the event that the undervoltage condition disappears before completion of the time delay.

The terminal 165 between capacitor 160, resistors 162 and 158 constitutes the output terminal for the undervoltage sensing and time delay network 20 and is connected to the anode of rectifier 104. Thus when the voltage on capacitor 160 reaches a sufficient value to bias the transistor 108 through the rectifier 104, transistor 108 will gate and energize its associated relay circuit including winding 112 in a manner previously described.

The operation will now be described in greater detail. Assuming that the overvoltage exists on phase A, an output voltage will appear at terminal 45 which is the output terminal of rectifier and filter circuit 10, previously described, and this overvoltage will be impressed across the rectifier 54, the terminal 58 and applied to the base of transistor 70 in a manner well-known in the art. When this overvoltage condition occurs, it is required that a fault signal be produced after a time delay which is inversely proportional to the magnitude of the difference between the monitored voltage and the predetermined and manually set trip level. This trip level may be referred to as the minimum trip voltage. Transistor 70 is connected as an emitter follower by resistor 72 having a variable tap 73 the setting of which constitutes the minimum trip level as previously described. The overvoltage appearing at terminal 45 is applied through rectifier 54 to terminal 58 and effectively increases the conductivity of transistor 70 such that the potential existing at tap 73 increases in proportion to the amount of overvoltage. This voltage increment is compared with a temperature-stabilized reference voltage obtained across Zener diode 80 and rectifier 82 by a gate circuit including transistor 75 and resistor 76. When the monitored voltage attenuated by resistor 72 is above the reference voltage, transistor 75 turns on and passes the monitored voltage to the base of transistor 85. Transistor 85 is connected as an emitter follower which is utilized to prevent the timing and output circuit from imposing an appreciable load on the sensing and gate circuits. The emitter of transistor 85 is at a voltage proportional to the monitored voltage, if the monitored voltage is above the minimum trip level. If the monitor voltage is below the minimum trip level, the emitter of transistor 85 will be at zero voltage. The voltage on the emitter of transistor 85 is applied to an adjustable potentiometer 87 and thereby applied to the timing circuit. In response to the overvoltage signal capacitor 96 begins to charge through resistor 94 the upper portion of the resistor 87 and transistor 85. When the voltage across the capacitor 96 reaches a specified level and is applied through diode 102 to the emitter of transistor 108, the transistor 108 will conduct and the unijunction transistor 108 becomes a low impedance between the anodes of diodes 100, 102, 104 and the relay winding 112. The break-over point is very stable with temperature and is primarily dependent upon the voltages on the bases of unijunction transistor 108. Therefore, when the voltage on the capacitor 96 reaches the break-over voltage of unijunction transistor 108 the unijunction transistor conducts and discharges capacitor 96 through the relay winding 112 thereby actuating it. The inverse time delay operation obtains because capacitor 96 is charged effectively from the monitored voltage and the time necessary for the capacitor 96 to charge is inversely proportional to the magnitude of the overvoltage. If the overvoltage disappears before capacitor 96 is charged to the voltage level required to turn on transistor 108, i.e. before the end of the overvoltage delay period, the emitter of transistor 85 returns to zero and the time delay circuit begins to reset because capacitor 96 begins to discharge through resistors 94 and 87. The time to reset is proportional to the set time delay and since the overvoltage time delay is short, it will reset rapidly.

If the monitored voltage exceeds a predetermined ceiling value as set by Zener diode 98, a voltage will appear across Zener diode 98 and be applied through rectifier 100 to gate or trigger the unijunction transistor 108 before the capacitor 96 has had an opportunity to charge. Thus the relay will be actuated instantaneously without the time delay involved in charging the capacitor 96.

Variable resistor 87 is used to compensate for production tolerances in the break-over point of unijunction transistor 108. By adjusting resistor 87, the DC voltage at the emitter of transistor 108 is adjusted so that at minimum trip, the voltage on the variable tap 88 is just equal to the break-over voltage of transistor 108. This adjustment provides a smooth, long-time delay at or just above the minimum trip voltage, thereby satisfying the inverse time delay requirement.

In response to undervoltages, the potential appearing on the terminal 60 will represent the potential of the lowest phase voltage. A fixed voltage is subtracted from this voltage by the Zener diode 136. This substraction is employed for two reasons: first, it allows the undervoltage trip point, as far as the circuit is concerned, to be near zero (2–3 volts direct current), and secondly, it provides a higher rate of change of voltage at the low value of 2–3 volts than would be available if the alternating current-to-direct-current ratio was set to give that voltage directly. This higher rate of change assures greater accuracy of trip point setting. The voltage at the top of resistor 138 which is a measure of the lowest phase voltage, is compared with the preset reference voltage obtained from the slider of potentiometer 152. The voltage on potentiometer 152 is stable since the voltage divider is connected directly to the regulated direct current source 66 by the resistor 155 as previously described.

When the monitored voltage is above the trip level, as set by resistor 152, transistor 142 is maintained in the on state and the RC network composed of resistors 158, 162 and capacitor 160 and rectifier 163 is at a low voltage of approximately 2 volts. When the monitored voltage drops below the trip level, base current flowing through transistor 142 which has been supplied through resistor 145 is diverted from the base of transistor 142 to diode 143 and transistor 142 turns off. When transistor 142 turns off, capacitor 160 begins to charge through resistor 150 and variable resistor 158 from the regulated supply 66. When the capacitor reaches the break-over point of unijunction transistor 108, this transistor is gated or triggered thereby discharging capacitor 160 and energizing the relay winding 112, tripping the relay armatures and opening the phase control armatures 130, 131 and 132. The time delay interval of the undervoltage time delay circuit is relatively long (preferably of the order of 5 sec.), therefore the previously described resetting circuit or resistors 162 and 152 and diode 163 permits capacitor 160 to discharge and therefore reset if the undervoltage disappears within the delay interval.

Because the overvoltage and undervoltage level response controls 73 and 153, respectively, are independently manually adjustable, the extent of the desired range of voltages may be selected. Further, the entire range may be moved upwardly or downwardly, depending upon the particular system requirements. Also, the control circuit 26 may be employed to remove selected portions of the load.

Although the foregoing explanation of the operation of the system has been based on monitoring three phases, it will be understood by those skilled in the art that any number of alternating current phases including single-phase power can be monitored with this apparatus. The principal requirement for additional phases is that each additional phase has its own rectifier and filter circuit and be connected by its own individual logic diodes to both the overvoltage and undervoltage sensing circuits. Thus a six-phase circuit would have six rectifier-filter circuits such as the rectifier-filter circuit 10 and the logic circuits 18 and 22 would have six OR inputs and six AND inputs, respectively. Conversely, if only a single-phase were to be monitored any one of the rectifier-filter circuits 10, 11 and 12 could be connected to the power system being monitored and the remaining power rectifier and filter systems could be disconnected or could remain idle.

If it is desired to monitor a direct current system this may be done by the elimination of rectifier and filter circuits 10, 11 and 12 and connecting the conductors of the direct current transmission system directly to the filter output terminals, such as the terminal 45 and neutral terminal 47. The system could also be used to monitor a plurality of direct current transmission systems and to respond to the overvoltage of the highest voltage of these systems and respond to the lowest undervoltage of any one of these systems by connecting one conductor of each of the systems to a respective one of the terminals 45, 50 and 52 and grounding the other conductor of each system to terminal 47.

From the foregoing explanation, it will be apparent to those skilled in the art that the concepts thereof can be employed in other embodiments without departing from the spirit and scope of this invention.

What is claimed is:

1. The combination according to claim 6 further comprising ceiling reference voltage means coupling said overvoltage sensing means to said second logic means, and wherein said second logic means is OR logic means whereby said control circuit responds instantaneously to a transmission system voltage above a predetermined ceiling reference voltage or responds to overvoltages less than said ceiling reference voltage after a predetermined time delay.

2. The combination according to claim 6 wherein said first time delay means includes a time delay circuit the delay time of which is inversely proportional to the magnitude of the overvoltage and wherein said second time delay means includes a time delay circuit, the delay of which is independent of the system voltages and a resetting circuit for resetting said second time delay means when the undervoltage condition disappears before the end of the time delay interval of said second time delay means.

3. The combination according to claim 6 wherein said first time delay means includes a resetting circuit which resets the first time delay means when the overvoltage condition disappears within the delay period of said first time delay means.

4. In an abnormal condition electrical protection apparatus for an alternating current power transmission system, the combination comprising:
 overvoltage sensing means coupled to said transmission system through OR logic means for responding to voltages above a predetermined range;
 undervoltage sensing means coupled to said transmission system through AND logic means for responding to voltages below said predetermined range;
 control circuit means; and
 means coupling both of said sensing means to said control circuit means and actuated thereby.

5. In an abnormal condition electrical protection apparatus for a power transmission system, the combination comprising:
 overvoltage sensing means coupled to said transmission system for responding to voltages above a predetermined range;
 undervoltage sensing means coupled to said transmission system for responding to voltages below said predetermined range;
 control circuit means; and
 means coupling both of said sensing means to said control circuit means for actuation thereby, said coupling means including first time delay means coupling said overvoltage sensing means to said control circuit means and having an automatic variable time delay which is inversely proportioned to the magnitude of the sensed overvoltage, said coupling means also including second time delay means coupling said undervoltage sensing means to said control circuit means whereby said control circuit means is actuated at predetermined time interval after the response of said undervoltage sensing means, a ceiling reference voltage circuit coupling said overvoltage sensing means to said control circuit whereby said control means is instantaneously actuated by an overvoltage above a predetermined ceiling reference voltage.

6. In a polyphase electrical power transmission system, an abnormal condition protection apparatus comprising:
   an overvoltage sensing means for sensing voltages above a predetermined range;
   an undervoltage sensing means for sensing voltages below said predetermined range;
   first logic means including OR logic means for coupling said overvoltage sensing means to each of said phases and including AND logic means for coupling said undervoltage sensing means to each of said phases; control circuit means; and
   second logic means including a first and a second time delay means coupling said control circuit to said sensing means.

References Cited

UNITED STATES PATENTS

| 2,959,717 | 11/1960 | Conger | 317—31 X |
| 3,239,718 | 3/1966 | Fegley | 317—33 X |
| 3,243,658 | 3/1966 | Blackburn | 317—31 |

LEE T. HIX, *Primary Examiner.*

J. D. TRAMMELL, *Assistant Examiner.*